US005387831A

United States Patent [19]

Yang

[11] Patent Number: 5,387,831

[45] Date of Patent: Feb. 7, 1995

[54] LOW CIRCULATION LOSS COMPOUND BRUSH

[76] Inventor: Tai-Her Yang, 5-1 Taipin St., Si-Hu Town, Dzan-Hwa, Taiwan, Prov. of China

[21] Appl. No.: 67,962

[22] Filed: May 27, 1993

[51] Int. Cl.[6] .............. H02K 13/00

[52] U.S. Cl. .............. 310/242; 310/45; 310/247; 310/249; 310/251

[58] Field of Search .............. 310/247, 248, 249, 251, 310/252, 253, 45, 239

[56] References Cited

U.S. PATENT DOCUMENTS

| | | | |
|---|---|---|---|
| 672,449 | 4/1901 | Markey | 310/248 |
| D. 701,369 | 6/1902 | Mills et al. | 310/240 |
| 1,028,964 | 6/1912 | Press | 310/248 |
| 1,736,844 | 11/1929 | Buchenberg | 310/239 |
| 1,826,478 | 10/1931 | Oswald | 310/248 |
| 2,125,027 | 7/1938 | Kasperowski | 310/248 |
| 2,783,405 | 2/1957 | Atkins et al. | 310/248 |
| 2,959,698 | 11/1960 | Titus | 310/249 |
| 4,000,430 | 12/1976 | Bely et al. | 310/248 |
| 5,198,715 | 3/1993 | Bolzan, Jr. et al. | 310/247 |
| 5,285,126 | 2/1994 | Hoffmann | 310/251 |

FOREIGN PATENT DOCUMENTS

| | | | |
|---|---|---|---|
| 2616275 | 12/1988 | France | 310/253 |
| 0202135 | 8/1989 | Japan | 310/248 |
| 256465 | 10/1943 | United Kingdom | 310/248 |
| 1509469 | 5/1974 | United Kingdom | 310/249 |

*Primary Examiner*—R. Skudy

*Attorney, Agent, or Firm*—Bacon & Thomas

[57] ABSTRACT

A compound structure for increasing brush resistance while reducing brush face short-circuit current loss includes multi-piece single-material, multi-piece different-material, or multi-piece graduated permeation material brushes arranged to reduce circulation losses.

6 Claims, 1 Drawing Sheet

LOW CIRCULATION LOSS COMPOUND BRUSH

SUMMARY OF THE INVENTION

A conventional brush is in general made of a single material. During commutation, the conductive face of the brush which slides against the two commutator or other relatively sliding contacts pieces allows eddy currents to form, resulting in brush over-heating and energy loss. The present design relates to a compound structure for increasing brush resistance while reducing brush face short-circuit current loss. To solve this problem, the invention provides compound brushes made from multiple pieces of a single material or different materials using a flexible overlapping method, a different-material overlaying method, or a different-material graduated permeation method, thereby providing a low circulation loss brush.

DETAILED DESCRIPTION OF THE PREFERRED EMBODIMENTS

The preferred low circulation loss compound brush includes: A. multiple pieces B. different-material multiple layers C. graduated permeation types. Each feature is described below.

A. Multi-Piece Structure

Figure 1:
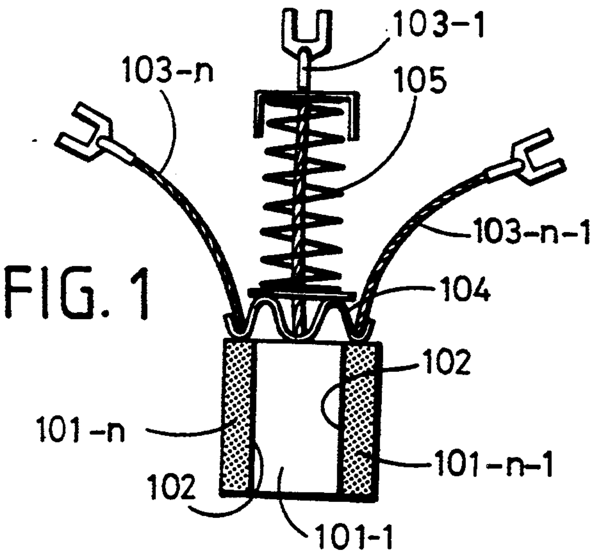
FIG. 1 is a partially cross-sectional plan view showing the structure of a multi-piece low circulation loss compound brush according to a first preferred embodiment of the invention.

FIG. 1 shows the structure of a preferred multi-piece low circulation loss compound brush, which is based on the concept of lengthening the circulation circuit so as to increase the circulation circuit resistance value and thus reduce the circulation or eddy current value.

The brush illustrated in FIG. 1 includes brush sets 101-n to 101-n-1 made up of at least two sets. Each brush set is made of the same material. A wear-resistant structure 102 such as an insulator may be mounted between each piece, an insulation coating may be applied between the pieces, or insulation grease may be added between each layer. Alternatively, each piece may be made of a different material, the pieces forming a sandwich, in which case the external parts of the sandwich are preferably constructed of higher resistance material, and the insulation treatment between each piece may either be performed as mentioned above or omitted.

Each brush has independent lead wires 103-n to 103-n-1 for common parallel or individual selective power conduction by means of a control circuit (not shown), the control circuit being of known type for use in a commutator or other machine. Each lead wire may include a series connected rectifying diode (not shown), such diodes being known.

The preferred brush also includes an equalizing reed 104 for bearing pressure from a compressed compression spring 105 and distributing the pressure to each brush set. Equalizing reed 104 may be made of a conductive metal, an insulation material, a conductive metal with an insulation treatment such as an insulating coating, or may consist of an insulating washer for separating each brush.

The compression spring 105, which is in the form of a sheet type, circle type, or multi-circle (coil) winding type spring as shown, is preferably provided for compressing the equalizing reed while distributing pressure to each brush.

Figure 2:
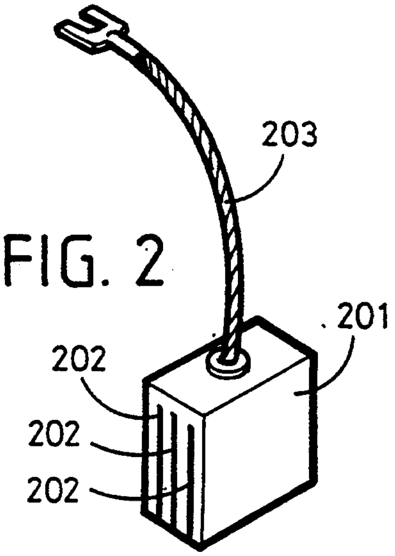
FIG. 2 is a perspective view showing a low circulation loss compound brush having groove-type notches filled with insulation according to a second preferred embodiment of the invention.

FIG. 2 shows an alternative low circulation loss compound brush structure in which a multi-piece structure is made up of groove-like notches filled with insulation.

A brush of this embodiment includes brush sets 201 constructed of a solid material, the face which contacts the commutator having a groove extending parallel to the insulation groove of the corresponding commutator pieces to increase the resistance value between each contact face.

An insulating filling 202 is placed within the grooves of the aforesaid brush sets 201 and is made of insulation and wear-resistant materials.

A lead wire 203 leads from a common side of the carbon brush sets, i.e., from the non-groove side.

B. Multi-Layer Structure

Figure 3:
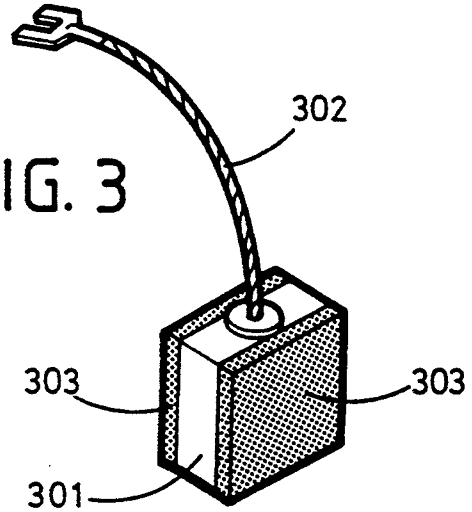
FIG. 3 is a perspective view showing a three-piece low circulation loss compound brush according to a third preferred embodiment of the invention.

FIGS. 3–6 show preferred variations of an integral brush made up of multiple layers of different materials, with the external layer being preferably made of a higher resistance coefficient material. FIG. 3 shows a three-piece low circulation loss compound brush, including an intermediate main brush 301 which is electrically connected to a lead wire 302 and surrounded on both sides relative to the sliding face by layers of a higher resistance coefficient material 303.

Figure 4:
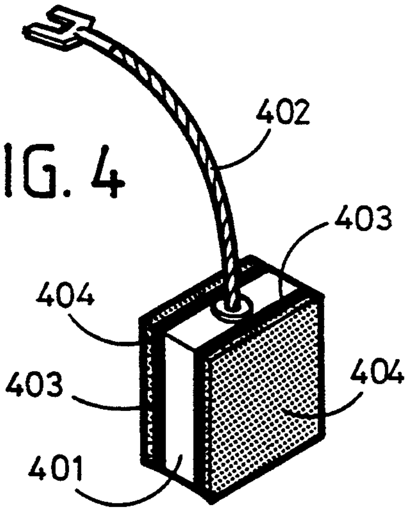
FIG. 4 is a perspective view showing a five-piece low circulation loss compound brush according to a fourth preferred embodiment of the invention.

An alternative multi-layer type brush is shown in FIG. 4. This five-piece low circulation loss compound brush includes an intermediate main brush 401 electrically connected to a lead wire 402 and surrounded on both sides relative to the sliding face by layers of higher resistance coefficient materials 403 and 404, the more external layers being constructed of a higher resistance coefficient material.

Figure 5:
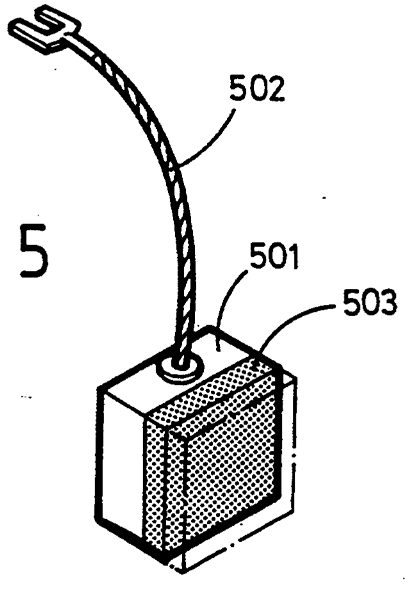
FIG. 5 is a perspective view showing a one-sided multi-layer low circulation loss compound brush according to a fifth preferred embodiment of the invention.

A one-sided multi-layer structure shown in FIG. 5. The one-sided multi-layer low circulation loss compound brush includes a main brush 501 electrically connected to a lead wire 502. This brush is electrically unilateral in operation, the brush face which couples with the side of the machine against the reaction angle of the armature being constructed of one or more layers of higher resistance coefficient materials 503 which are partially integrated with the main brush.

Figure 6:
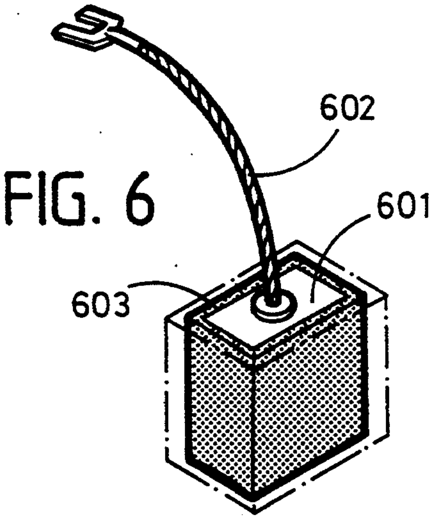
FIG. 6 is a perspective view showing a multi-layer circular-casing low circulation loss compound brush according to a sixth preferred embodiment of the invention.

In addition, the brush shown in FIGS. 3–5 can be constructed of a multi-layer material having a higher resistance coefficient and which covers the exterior of the main brush, as shown in FIG. 6. The multi-layer circular-casing low circulation loss compound brush of FIG. 6 includes a main brush 601 electrically connected directly to a lead wire 602, and a partial circular structure 603 made of a higher resistance coefficient material integrated around the main brush. The circular part is made of one or more layers, and if constructed of multiple circular layers, the more external layers are made of the highest resistance coefficient material.

Those skilled in the art will appreciate that, in the embodiments of FIGS. 3–6, the parts made of higher resistance coefficient material integrated with the main brush are provided for limiting brush circulation so as to depress sparks.

C. Graduated Permeation Structure

Instead of providing layers having a single resistance coefficient, the brushes shown in FIGS. 3–6 may be modified by, during manufacture, causing both sides, one side, or circular external layers to be made of materials having a gradually lower resistance coefficient towards the center of the brush, the central, lowest resistance coefficient part being connected with the lead wire.

In summary, the preferred circulation loss compound brushes provide brush sets that have different resistance coefficients across the coupling face to depress short-circuit circulation within the brush face, and therefore reduce sparks so as to increase electrical machine efficiency and prolong life span.

I claim:

1. A low circulation loss compound brush structure, comprising:
   - a first piece of brush material having a first resistance, a first wear-resistant insulator layer which abuts the first piece of material, a second piece of brush material which abuts the first wear-resistant insulator layer and has a second resistance, a second insulator layer which abuts the second piece of brush material, and a third piece of brush material which abuts the second insulator layer and has said first resistance, the first resistance being higher than the second resistance;
   - a compression spring for applying spring pressure to said pieces of brush material;
   - an equalizing reed for bearing the spring pressure and distributing the pressure between the first, second and third pieces of brush material; and
   - separate lead wires for each said piece of brush material.

2. A brush structure as claimed in claim 1 wherein said insulator layers comprise an insulating coating on each said piece of brush material.

3. A brush structure as claimed in claim 1, wherein said insulator layers comprise an insulator member mounted between each said piece of brush material.

4. A brush structure as claimed in claim 1, wherein said insulator layers comprise insulation grease.

5. A brush structure as claimed in claim 1, wherein said equalizing reed is made of a conductive metal treated with insulation.

6. A brush structure as claimed in claim 5, wherein said compression spring is a coil spring.

* * * * *